(12) United States Patent
Hayakawa et al.

(10) Patent No.: US 7,171,923 B2
(45) Date of Patent: Feb. 6, 2007

(54) WATER SUPPLY TANK UNIT AND HEATING APPARATUS HAVING THE SAME

(75) Inventors: Yuji Hayakawa, Nara (JP); Kouji Kanzaki, Yamatokoriyama (JP); Yasuhiko Inoue, Toyonaka (JP); Takashi Sugimoto, Suita (JP); Kenichiro Fukumura, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 351 days.

(21) Appl. No.: 10/846,409

(22) Filed: May 14, 2004

(65) Prior Publication Data

US 2004/0255871 A1 Dec. 23, 2004

(30) Foreign Application Priority Data

May 15, 2003 (JP) ............ P. 2003-137473

(51) Int. Cl.
*F24H 1/18* (2006.01)
(52) U.S. Cl. .............. 122/20 R; 261/DIG. 65; 392/406
(58) Field of Classification Search .......... 122/20 R, 122/19.2, 31.1, 36; 261/DIG. 65; 360/99.02, 360/99.06, 99.07; 392/406
See application file for complete search history.

(56) References Cited

U.S. PATENT DOCUMENTS

| 5,048,304 | A | * | 9/1991 | Takeuchi | .............. 62/305 |
| 5,111,740 | A | | 5/1992 | Klein | |
| 5,242,375 | A | * | 9/1993 | McDonough | ........... 600/22 |
| 5,339,383 | A | * | 8/1994 | Marino | ............ 392/406 |
| 5,636,319 | A | * | 6/1997 | Glucksman et al. | ...... 392/406 |
| 5,952,634 | A | | 9/1999 | Yoshida | |
| 6,157,006 | A | | 12/2000 | Sickles et al. | |
| 2002/0039487 | A1 | * | 4/2002 | Wang | ............ 392/395 |

FOREIGN PATENT DOCUMENTS

| JP | 53-21184 | 7/1951 |
| JP | 54-44076 | 4/1979 |
| JP | 54-44077 | 4/1979 |
| JP | 54-48090 | 4/1979 |
| JP | 54-48091 | 4/1979 |
| JP | 54-49376 | 4/1979 |
| JP | 54-115448 | 9/1979 |
| JP | 3-7924 | 1/1991 |

* cited by examiner

*Primary Examiner*—Gregory Wilson
(74) *Attorney, Agent, or Firm*—Pearne & Gordon LLP

(57) ABSTRACT

The present invention provides a water supply tank unit which can treat water that has leaked when a water supply tank is pulled out so that it does not remain. In the invention, a water supply tank unit which is attached to a high-frequency heating apparatus with a steam generating function and holds a water supply tank detachably, said tank unit comprises: a water supply tank 17 having a water supply port 55 on its side surface; a tank case door member 31 for supporting the water supply tank 17, which has a water inlet 59 connected to the water supply port 55 with an inserting operation of the water supply tank 17, and a scupper 60 formed around an elastic fitting piece by perforating a bottom part near the water inlet 59; and a sponge provided below the scupper 60.

8 Claims, 9 Drawing Sheets

WATER SUPPLY TANK UNIT AND HEATING APPARATUS HAVING THE SAME

BACKGROUND OF THE INVENTION

1. Field of the Invention

The present invention relates to a water supply tank unit which is attached to a heating apparatus having a steam generating function and holds a water supply tank detachably. Moreover, the present invention relates to a heating apparatus having the water supply tank unit.

2. Description of the Related Art

A high-frequency heating apparatus provided with a high-frequency generating means which outputs a high frequency wave into a heating room in which a heated matter is housed, since it can efficiently heat the heated matter into the heating room in a short time, has spread rapidly as an electronic oven that is a heat cooking device for food material.

However, heating by only use of high-frequency heating, limits heat cooking.

Therefore, a high-frequency heating apparatus in which an electric heating device that generates heat into a heating room is added to enable oven heating has been proposed, and further a high-frequency heating apparatus with a steam generating function in which a steam supply mechanism for supplying heating steam into a heating room is added to enable also heat cooking by high-temperature steam has been recently proposed (for example, refer to Patent Reference 1: JP-A-54-115448).

The steam supply mechanism of the high-frequency heating apparatus with a steam generating function comprises a water supply tank installed in an apparatus body through an tank support member detachably; a supplied water receiver provided into a heating room; and a heating means which heats this supplied water receiver and evaporates the water on the supplied water receiver. The water is, after a water supply port provided for the water supply tank has been inserted into a water inlet on the heating apparatus side, is supplied through a water supply pipe connected to this water inlet to the water receiver. However, in case that the water supply tank is pulled out from the tank support member, when the water supply port of the water supply tank separates from the water inlet on the heating apparatus side, a small amount of water may drop into the water inlet due to pressure of the water supply pipe path. Therefore, there is fear that this water that has dropped stays in a member for housing the water supply tank on the heating apparatus side and it enters in a circuit area such a power supply into the heating apparatus to influence the circuit area. Further, when the water that has leaked into the member for housing the water supply tank is attached to the bottom surface of the water supply tank, there is fear that a user misunderstands that the water is leaking from the water supply tank.

SUMMARY OF THE INVENTION

In view to the above conventional circumstances, it is an object of the invention to provide a water supply tank unit which can treat the water that has leaked when the water supply tank is pulled out so that it does not remain.

In order to achieve the above object, a water supply tank unit according to the invention, which is attached to a heating apparatus having a steam generating function and holds a water supply tank detachably, is characterized by comprising: a tank support member which has a water pour connection port connected to a water supply connection port with an inserting operation of the water supply tank, and a scupper provided at the bottom near the water pour connection port, and supports the inserted water supply tank; and a water absorption means provided below the scupper of the tank support member.

Therefore, the water that has leaked from the water supply connection port or the water pour connection port comes out through the scupper from the tank support member, and is absorbed by the water absorption means. Consequently, in case that the water has leaked out into the tank support member, the leaking water can be treated so as not to remain. In result, it is not misunderstood that the water is leaking from the water supply tank.

Further, the water supply tank unit of the invention is characterized in that at the bottom of the tank support member, a water-storing wall which surrounds the scupper and stands from the bottom is provided. Therefore, since the flow of the water that has leaked into the tank support member is stanched by the water storing wall, the water can be treated so as not to flow to the other area at the tank support member bottom than the area surrounded by the water storing wall.

Further, The water supply tank unit of the invention is characterized in that the water storing wall has at its part a straight wall part parallel to the inserting direction of the water supply tank, and the water supply tank has at the tank bottom a guide which comes into slide-contact with the straight wall part in insertion into the tank support member. Therefore, since the guide located at the water supply tank bottom can be brought into slide-contact with the straight wall part of the tank support member to insert the water supply tank into the tank support member, the water supply tank is held in an exact position.

Further, the water supply tank unit of the invention is characterized in that a raised bottom part which defines space for bringing the water storing wall of the tank support member and the bottom inside the water storing wall into no-contact with the tank bottom of the water supply tank when the water supply tank is held by the tank support member is formed at a part of the bottom of the water supply tank. Therefore, even in case that the water is attached onto the water storing wall or the bottom inside the water storing wall, this water is not attached onto the tank bottom, so that it is possible to prevent the water from leaking through the tank bottom to the outside of the water storing wall.

Further, the water supply tank unit of the invention is characterized in that: the tank support member has at its bottom an elastic fitting piece provided with a projection part which fits to the water supply tank inserted to the tank support member and locks the water supply tank; and the elastic fitting piece is formed by providing a cavity around the elastic fitting piece except its base part at the bottom of the tank support member, and the cavity is used as the scupper. Therefore, the water supply tank is held surely in the tank support member by the projection part. Further, since the water that has leaked into the tank support member drops from the cavity around the elastic fitting piece and is absorbed by the water absorption member, labor and cost for forming the scupper newly can be omitted.

In the drawings, a reference numeral 100 refers to a high-frequency heating apparatus; 17 to a water supply tank; 20 to a water supply tank unit; 7 to a steam generating part; 25 to an evaporation tray; 1 to a sponge; 35 to an operation member; 27 to a tank case body; 25 to a side surface heat insulating plate; 51 to a tank body; 57 to a tank lid member; 55 to a water supply port; 54 to a raised bottom part; 54a, 69 to a projection; 52a, 52b to a bottom rib; 59 to a water inlet; 61 to a stanch rib; 65 to an upper surface part; 65a, 67a to a guide wall; 60 to a scupper; 63 to an elastic fitting piece; 61a, 61b to a straight wall part; 66 to an end part; 67 to a bottom surface part; 68 to a side surface part; 31a, 31b to a sidewall; 51a, 51b to a guide rib; 33, 45 to a shut-off valve; 33a, 45a to a valve body; 33b, 45b to a spring; 49 to an O-ring; and 43 to a base end circular tube part.

Additionally, a reference sign S refers to a housing space.

DETAILED DESCRIPTION OF THE PREFERRED EMBODIMENTS

One embodiment of water supply tank structure of the invention will be described in detain below with reference to attached drawings.

Herein, as an example of a heating apparatus having a steam generating function and being provided with a water supply tank unit, a high-frequency heating apparatus with a steam generating function is taken.

Figure 1:
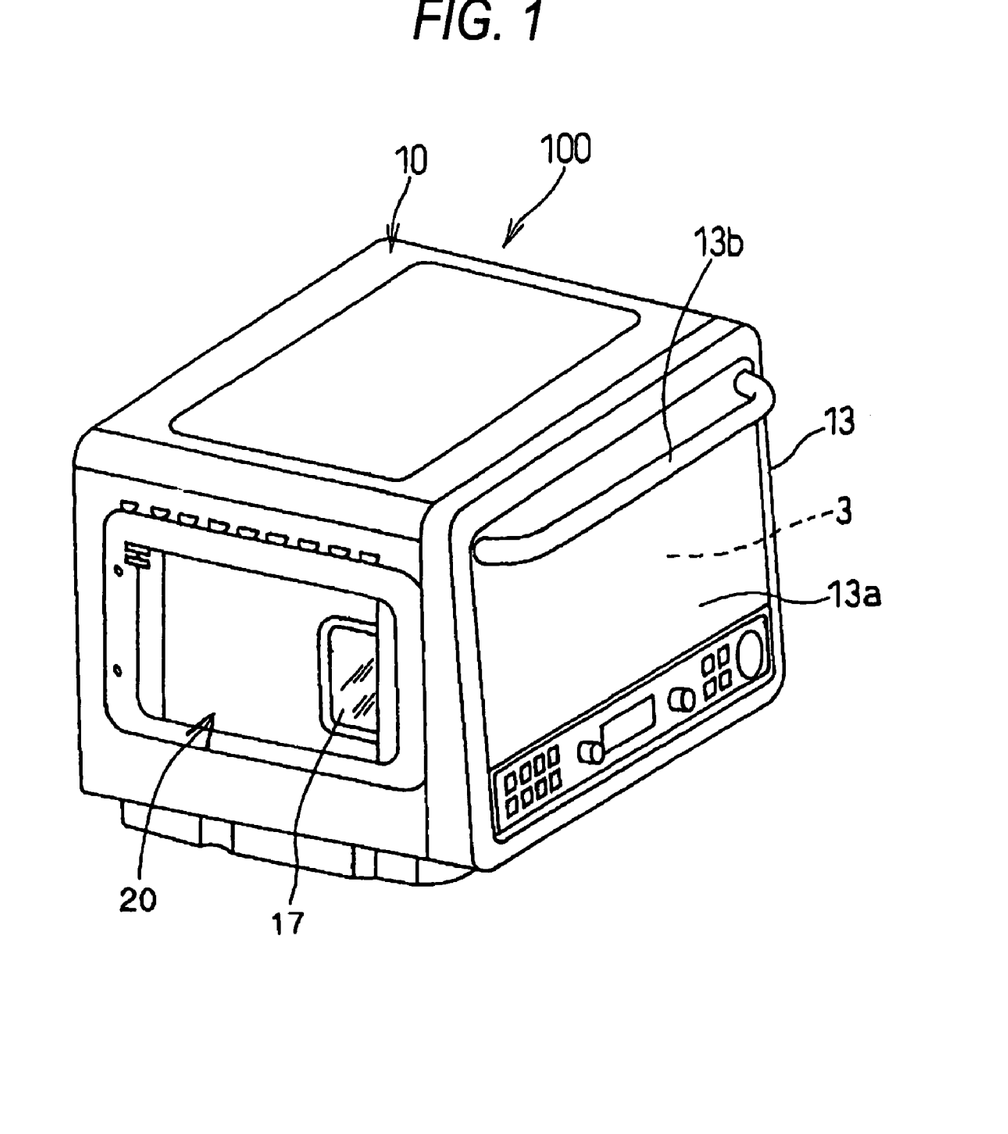
FIG. 1 is an exterior perspective view of a high-frequency heating apparatus with a steam generating function according to the invention.
Figure 2:
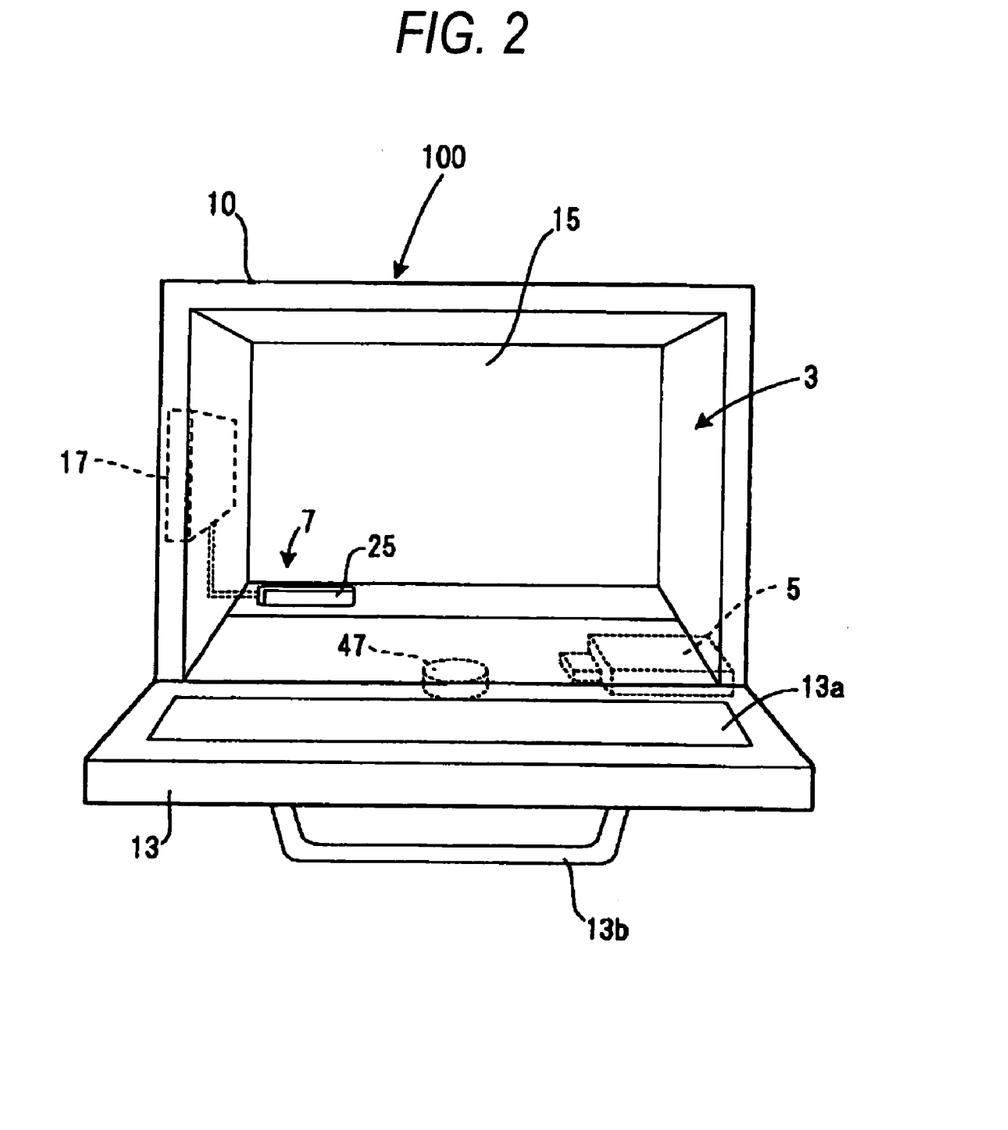
FIG. 2 is a schematically front view showing a state where a door of the high-frequency heating apparatus with the steam generating function is opened.

FIG. 1 is an exterior perspective view of a high-frequency heating apparatus with a steam generating function according to the invention, and FIG. 2 is a schematically front view showing a state where an opening-and-closing door of the high-frequency heating apparatus with a steam generating function is opened.

In the invention, as shown in FIG. 1, in order to give the steam generating function to a high-frequency heating apparatus 100, a water supply tank unit in which a water supply tank for supplying water to a steam generating part is housed is arranged on a side surface of the high-frequency heating apparatus 100. The invention is characterized in that water leakage from this water supply tank unit, which is produced when the water supply tank unit is pulled out, does not have an influence on the high-frequency heating apparatus 100 side. Firstly, the basic structure of the high-frequency heating apparatus 100 as the heating apparatus and its working will be described.

This high-frequency heating apparatus 100, as shown in FIGS. 1 and 2, is a heat-cooking apparatus which supplies at least either a high-frequency wave (microwave) or steam to a heating room 3 in which a heated matter such as food material is housed to treat the heated matter by use of heat. The high-frequency heating apparatus 100 includes a magnetron 5 which outputs the high-frequency wave into the heating room 3 for housing the heated matter such as the food material therein, a steam generating part 7 which generates steam into the heating room 3, and a water supply tank 17 which is connected to a water supply passage to the steam generating part 7 detachably.

The heating room 3 is formed inside a box-shaped body case 10 of which a front surface is open, and an opening-and-closing door 13 which has a light-permeable window 13a, and opens and closes a heated matter outlet is provided on the front surface of the body case 10.

The magnetron 5 is arranged in space on the downside of the heating room 3, and a stirrer vane 47 is provided in a position where the high-frequency wave generated from this magnetron 5 is received. The high-frequency wave from the magnetron 5 is applied to the rotating stirrer vane 47, whereby the high-frequency wave, being stirred in the heating room 3 by the stirrer vane 47, is supplied.

The steam generating part 7 is provided with an evaporation tray 25 having a water storing recess that generates steam by heating. Below this evaporation tray 25, an evaporation tray heating heater for heating the evaporation tray 25, which is not shown, is provided. As the evaporation tray 25, an elongate tray made of, for example, stainless, or an aluminum block which is die casting-molded integrally with an evaporation tray heating heater and has a water storing recess on its upper surface may be used. Further, though one evaporation tray 25 is provided in FIG. 2, the plural evaporation trays may be provided.

Figure 3A:
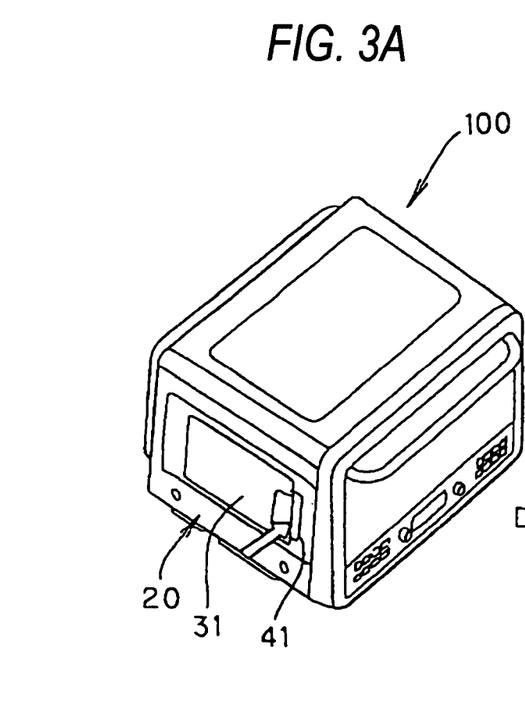
FIGS. 3A to 3C are an explanatory views showing a procedure of taking out a water supply tank from the high-frequency heating apparatus with the steam generation function.
Figure 3B:
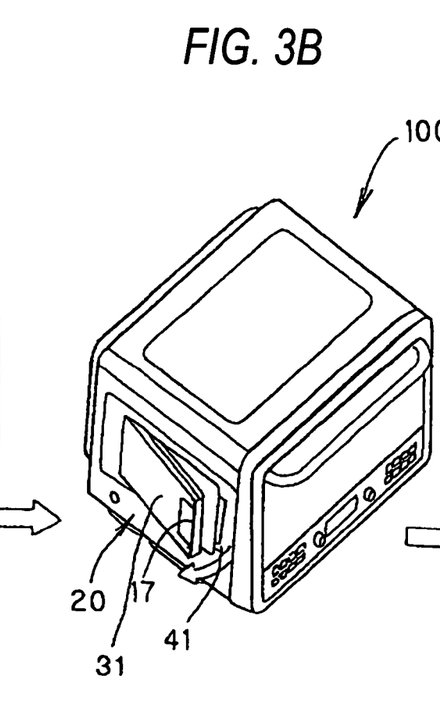
Figure 3C:
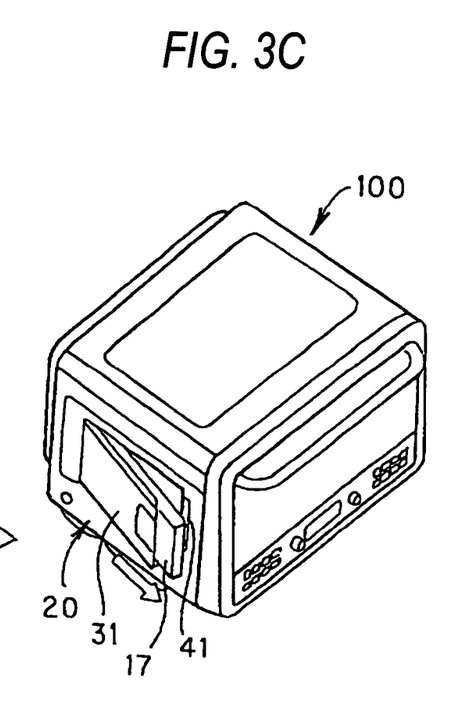

FIGS. 3A to 3C show a procedure of taking out the water supply tank 17 from the high-frequency heating apparatus 100. As shown in FIG. 3A, a push button 41 provided on this side on the side surface of the high-frequency heating apparatus 100 is pressed toward the inside of the high-frequency heating apparatus 100. Hereby, as shown in FIG. 3B, a tank case door member 31 and the water supply tank 17 placed on this door member open outward from the side surface of the high-frequency heating apparatus 100. The tank case door member 31 corresponds to a tank support member in the Claims. Next, as shown in FIG. 3C, the water supply tank 17 is pulled out to the front side of the high-frequency heating apparatus 100 thereby to be taken out.

Further, in case that the water supply tank 17 is housed, it is inserted to the innermost in an opposite procedure to the above procedure, and the tank case door member 31 is pressed back.

The structure of a water supply tank unit 20 in which the water supply tank 17 is detachably attached to the high-frequency heating apparatus 100 will be described below.

Figure 4:
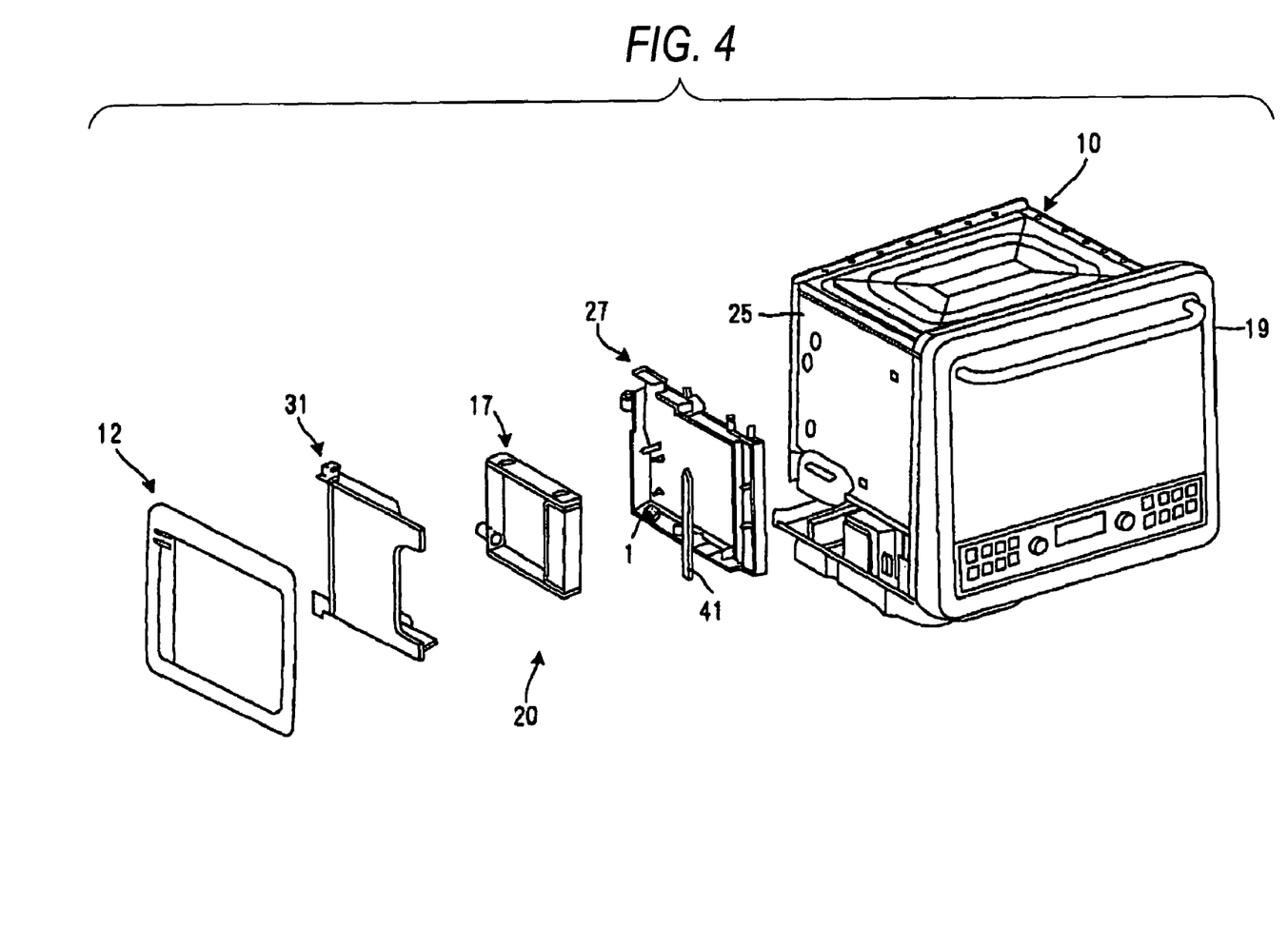
FIG. 4 is an exploded perspective view of a water supply tank unit in which the water supply tank is arranged on a side surface of the high-frequency heating apparatus.
Figure 5:
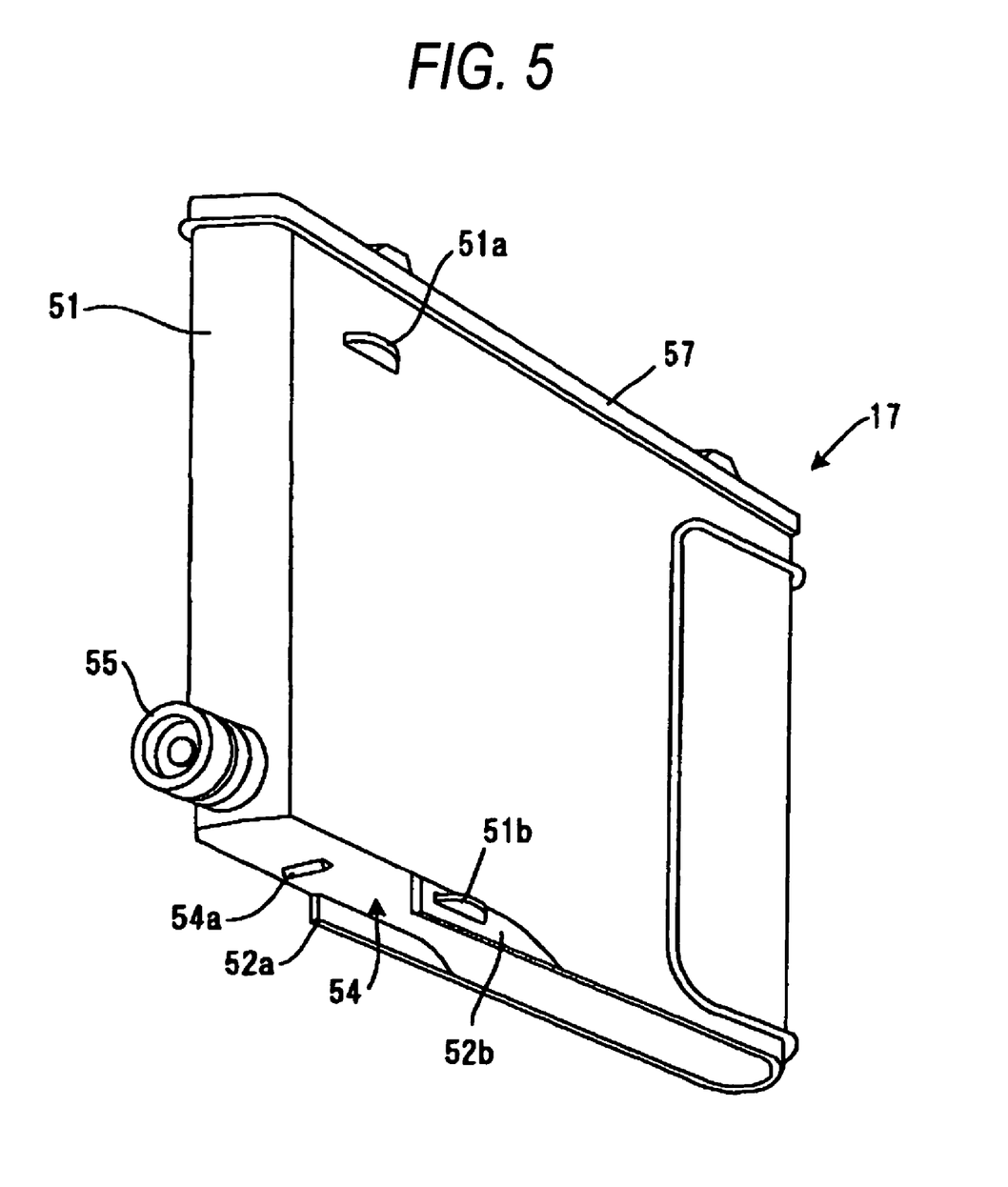
FIG. 5 is an enlarged perspective view of the water supply tank.
Figure 6:
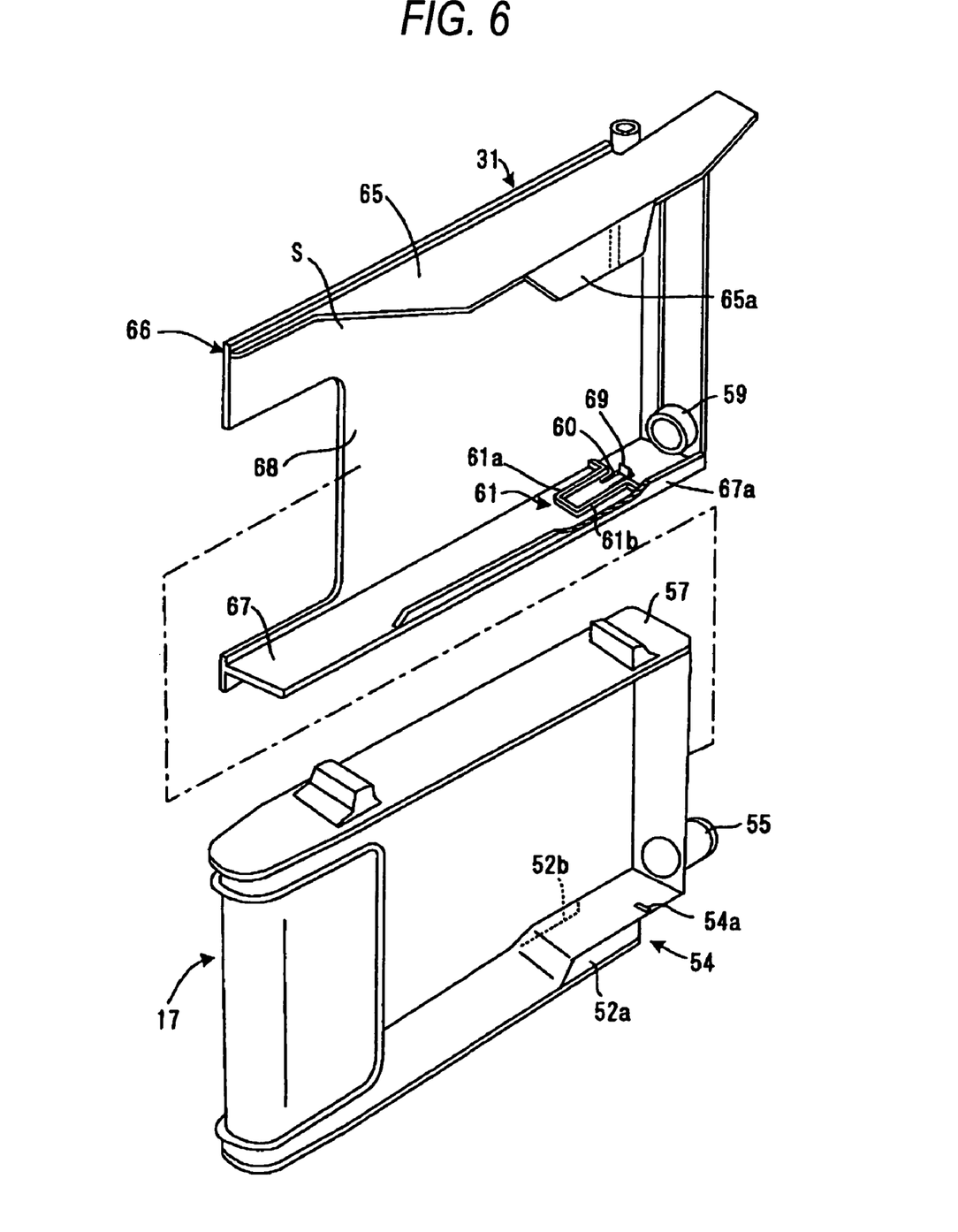
FIG. 6 is a schematically exploded perspective view of the water supply tank unit, which explains the detailed structure of the water supply tank unit.
Figure 7A:
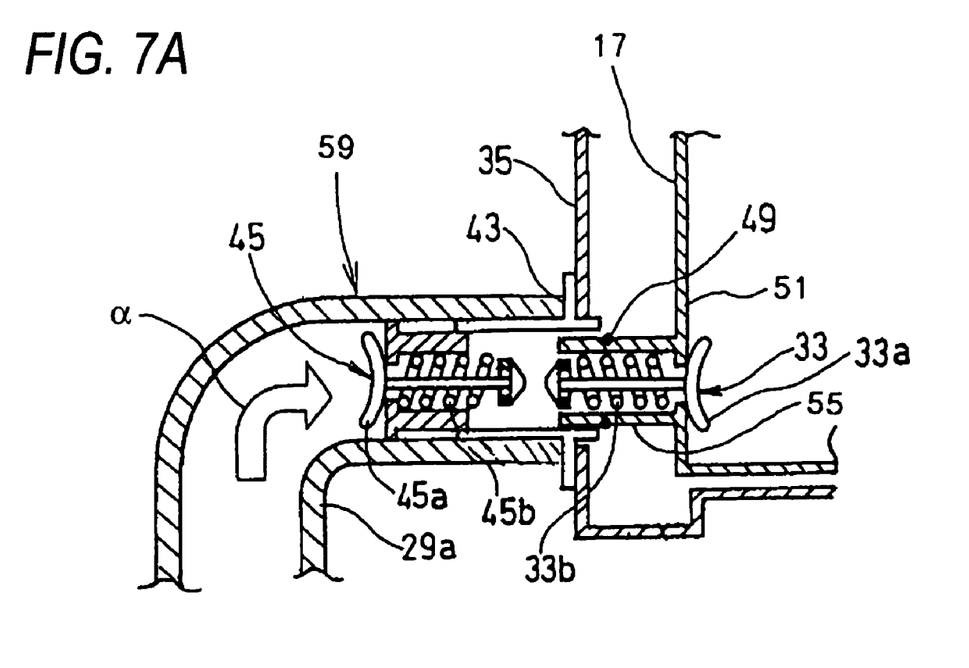
FIGS. 7A and 7B are an explanatory views of a coupling part between a water supply port and a water inlet.
Figure 7B:
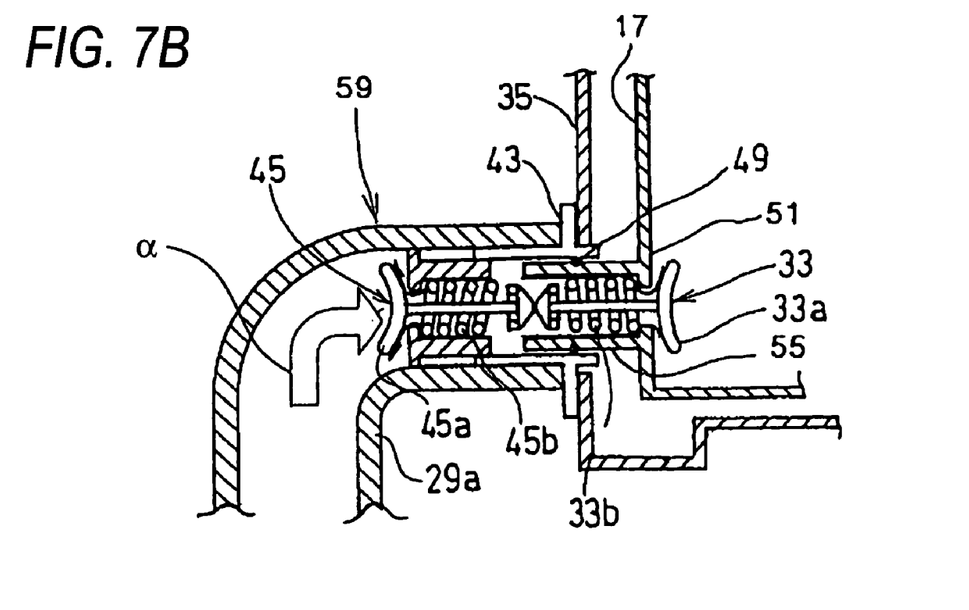
Figure 8:
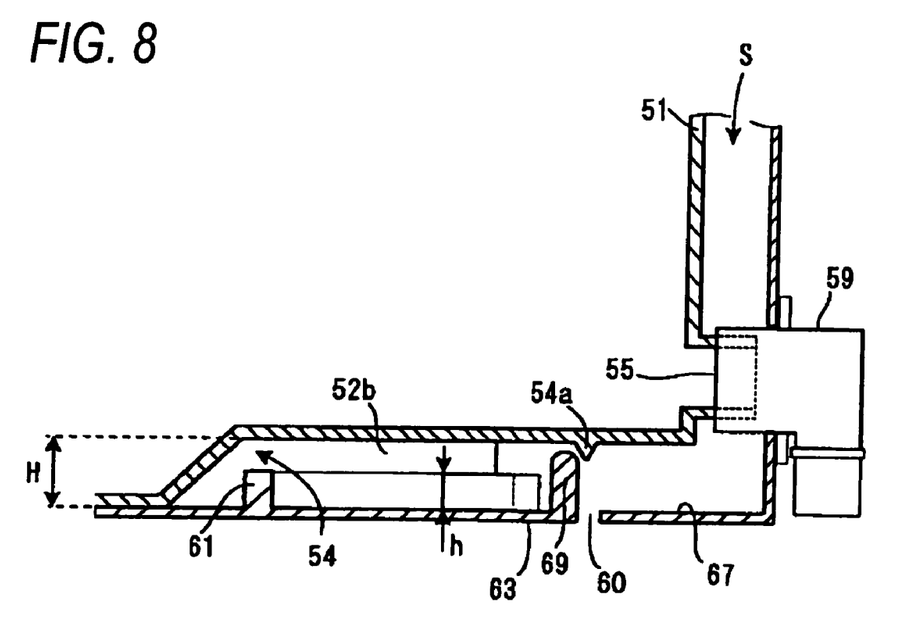
FIG. 8 is a sectional view showing a state where the water supply tank is inserted into a tank case door member.
Figure 9:
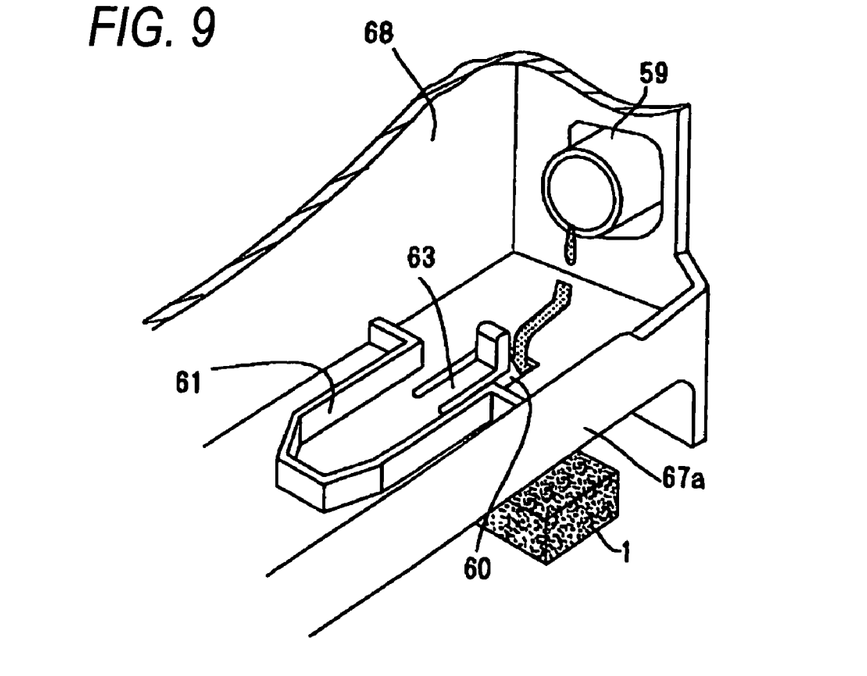
FIG. 9 is an enlarged view of a bottom part of the tank case door member.
Figures 10A, 10B:
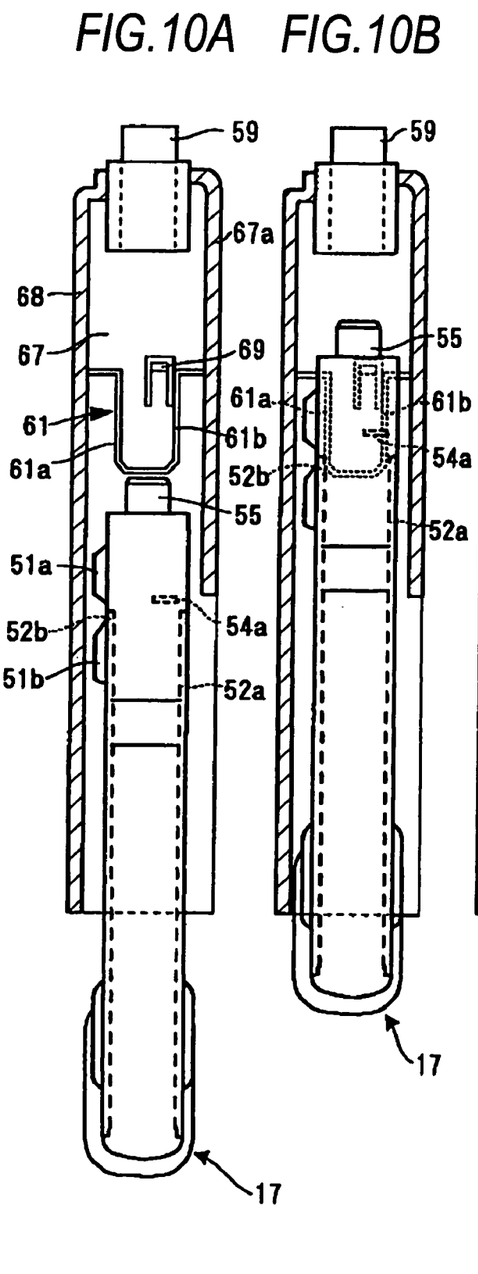
FIGS. 10A to 10D are explanatory diagrams showing a positional relation among the water supply tank, a guide wall, and the water inlet when the water supply tank is attached.
Figure 10C:
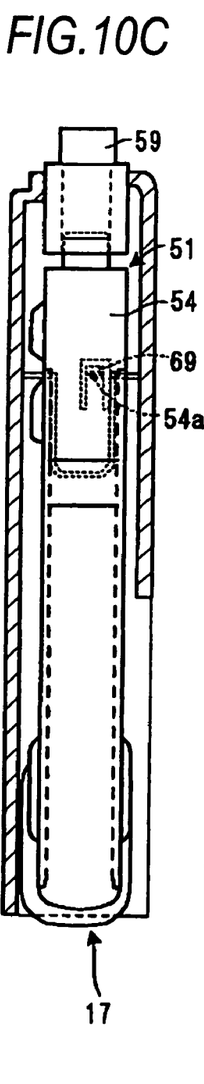
Figure 10D:
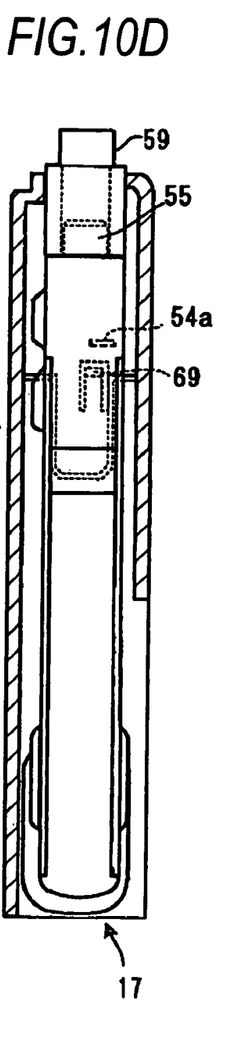

FIG. 4 is an exploded perspective view of the water supply tank unit in which the water supply tank is arranged on the side surface of the high-frequency heating apparatus 100, FIG. 5 is an enlarged perspective view of the water supply tank, FIG. 6 is a schematically exploded perspective view of the water supply tank unit, which explains the detailed structure of the water supply tank unit, FIG. 7 is an explanatory view of a coupling part between a water supply port and a water inlet, FIG. 8 is a sectional view showing a state where the water supply tank is inserted into the tank case door member, FIG. 9 is an enlarged view of a bottom of the tank case door member, and FIG. 10 is an explanatory diagram showing a positional relation among the water supply tank, a guide wall, and the water inlet when the water supply tank is attached.

Onto the side surface of the high-frequency heating apparatus 100, as shown in FIG. 4, a side surface heat insulating plate 25 is fixed with the predetermined space from a side wall plate inside the heating room to the outside of the high-frequency heating apparatus 100, and a tank case body 27 is attached to this side surface heat insulating plate 25 with the predetermined space.

One side part of the tank case door member 31 is supported openably and closably about a support shaft by this tank case body 27. Further, between the tank case body 27 and the tank case door member 31, the water supply tank 17 is housed in a state where it is placed on the tank case door member 31. In the predetermined position on a bottom surface of the tank case body 27, a sponge 1 functioning as a water absorption means is bonded. The bonding position of the sponge 1 will be described later. On the outside of the tank case door member 31, a cover 12 is attached.

Next, the water supply tank 17 and the tank case door member 31 will be described in detail.

The water supply tank 17 is formed in the shape of a flat rectangular parallelepiped, and comprises, as shown in FIG. 5, a tank body 51, a water supply port 55 corresponding to a water supply connection port in the Claims, and a tank lid member 57 attached to the tank body 51 detachably. Further, the water supply tank 17 has a raised bottom part 54 at a part of its bottom near the water supply port 55. Further, a part of a side surface of the tank lid member 57 of the water supply tank 17 has a function of guiding the water supply tank 17 to the predetermined holding position in a housing space S by contact with a guide wall 65a of the tank case door member 31.

This water supply tank 17 is inserted into the tank case door member 31 as shown in FIG. 6, whereby the water supply port 55 is connected to a water inlet 59 of the tank case door member 31. The water inlet 59 corresponds to a water pour connection port in the Claims. In this state, the water inside the water supply tank 17 is fed from the water supply port 55 through the water supply passage into the evaporation tray 25 (refer to FIG. 2) provided at an end of the water supply passage.

Here, an engaging operation between the water supply port 55 and the water inlet 59 will be described.

In a base end pipe part 29a of the water inlet 59, as shown in FIG. 7A, a base end circular tube part 43 of the water inlet 9 with which the water supply port 5 of the tank body 51 engages is provided with a pipe-sided shut-off valve 45 for preventing water leakage when the tank body 51 is detached. In the state shown in FIG. 7A, the water supply port 55 of the tank body 51 has not engaged with the base end circular tube part 43 yet, and both of a tank-sided shut-off valve 33 and the pipe-sided shut-off valve 45 close the flowing passage.

In the tank-sided shut-off valve 33 and the pipe-sided shut-off valve 45, a direction of a spring 33b for energizing a valve body 33a is opposite to a direction of a spring 45b for energizing a valve body 45a. In case that the water supply port 55 of the tank body 51 is appropriately engaged with the base end circular tube part 43, as shown in FIG. 7B, the leading ends of the both valve bodies 33a and 45a abut on each other, and they give displacement to the respective opposite leading ends against the energizing power of the springs 33b and 45b, whereby the flowing passage is opened. Further, at the peripheral portion of the water supply port 55 of the tank body 51, an O-ring 49 is provided as a seal member for plugging a gap between the water supply port and the base end circular tube part 43.

On the other hand, the tank case door member 31 into which this water supply tank 17 is inserted and attached, as shown in FIG. 6, comprises an upper surface part 65, a side surface part 68, and a bottom surface part 67, which form the housing space S. For the upper surface part 65 and the bottom surface part 67, guide walls 65a and 67a which come into contact with the side surface of the water supply tank 17 to guide the attachment and detachment operations of the water supply tank 17 are provided in the attachment direction of the water supply tank 17. Further, the tank case door member 31 includes the water inlet 59 connected to the water supply port 55 with the inserting operation of the water supply tank 17, a scupper 60 provided at the bottom part near the connection end of the water inlet 59, and a stanch rib 61 which surrounds the scupper 60 and stands from the bottom part. The protrusion height of this stanch rib 61 from the bottom part 67 (refer to FIG. 8) is set to a height h by which the flow of the water that has dropped is surely stanched. In this embodiment, this protrusion height h is about 3 mm. Further, the stanch rib 61 is provided continuously from the side surface 68 to the guide wall 67a, and its intermediate part is formed nearly in C-shape. Therefore, the area of the bottom part 67 near the scupper 60 is completely surrounded by the stanch rib 61, the side surface part 68, the guide wall 67a, and a sidewall having the water inlet 59. Further, the stanch rib 61, the side surface part 68, the guide wall 67a, and the sidewall having the water inlet 59 constitute a water-storing wall. Further, the stanch rib 61 has partially straight wall parts 61a and 61b which become parallel to the inserting direction of the water supply tank 17, that is, the guide wall 67a and the side surface part 68.

The bottom surface part 67 of the tank case door member 31, as shown in FIG. 8, has an elastic fitting piece 63 in which a projection 69 over which the water supply tank 17 gets in the attachment process in the predetermined holding position in the housing space S to be locked is formed. The projection 69 corresponds to a projection part in the Claims. The elastic fitting piece 63 is formed by providing a groove around the elastic fitting piece 63 except its base part at the bottom part 67, and this groove is used as the scupper 60. In the state where the water supply tank 17 is attached to the tank case door member 31, a spaced height H between the bottom surface part 67 of the tank case door member 31 and the bottom in the raised bottom part 54 of the tank body 51 is set to a height by which contact of the bottom of the tank body 51 with the water is prevented even in case that water adheres to the top of the stanch rib 61. In this embodiment, this spaced height H is about 5 mm. Therefore, existence of space of height H-h (in this embodiment, about 2 mm) prevents, even if the water that has flown out of the water support port 55 or the water inlet 59 adheres to the stanch rib 61 or the bottom surface part 67 surrounded by the stanch rib 61, this water from adhering to the bottom part of the tank body 51.

Namely, when the water supply tank 17 is pulled out from the tank case door member 31, as shown in FIG. 9, a small amount of water remaining the connection part between the water supply port 55 and the water inlet 59 may flow out. At this time, the water droplet has flown out from the water inlet 59 or the water supply port 55 passes through the scupper 60 around the elastic fitting piece 63 and is absorbed in the sponge 1 bonded in the predetermined position of the tank case body 27 bottom. The sponge 1 is bonded in a position of the tank case body 27 bottom which is under the scupper 60 when the tank case door member 31 is closed. Since the flow of the water that has flown out from the water inlet 59 or the water supply port 55 is stanched by the stanch rib 61, the side surface part 68, the guide wall 67a, and the side wall having the water inlet 59, it always flows through the scupper 60 to the outside of the tank case door member 31 and is absorbed in the sponge 1. Namely, since the flow of the water is stanched by the stanch rib 61, it does not spread over other regions of the bottom surface part 67 than the region partitioned by the stanch rib 61. Further, the water absorbed in the sponge 1 is evaporated by heat generated when the high-frequency heating apparatus 100 operates. In place of the sponge, an unwoven fabric that is good in water absorbability may be used. Further, the scupper 60 may be provided for the bottom part under the connection end of the water inlet 59.

Further, as shown in FIGS. 6 and 8, the raised bottom part 54 defines when the water supply tank 17 is held by the tank case door member 31, space by which the stanch rib 61 of the tank case door member 31 and the bottom surface part of the tank case door member 31 surrounded by the stanch rib 61 are not brought into contact with the bottom of the water supply tank 17. Further, in the raised bottom part 54, as shown in FIG. 5, a projection 54a for locking the water supply tank 17 when the water supply tank 17 is attached to the tank case door member 31 is formed projectingly from the tank bottom surface to the downside. This raised bottom part 54 prevents, even if the water that has flown out of the water support port 55 or the water inlet 59 adheres to the stanch rib 61 or the bottom surface part 67 surrounded by the stanch rib 61, this water from adhering to the bottom part of the tank body 51. Further, the raised bottom part 54, as shown in FIG. 5, has a projection 54a of which a part is protruded to the outside. Further, the water supply tank 17 has bottom ribs 52a and 52b formed by protruding both edges of its bottom from the vicinity of the surface having the water supply port 55 in the longitudinal direction.

Next, an operation of attaching the water supply tank 17 in the predetermined holding position of the tank case door member 31 will be described in detail.

As shown in FIG. 10A, in case that the water supply tank 17 is inserted from a state where it is placed on the bottom surface 67 of the tank case door member 31, guide ribs 51a and 51b provided for the front portion in the inserting direction on the side surface of the tank body 51 come into slide-contact with the side surface part 68 of the tank case door member 31, whereby the water supply tank 17 is positioned. Namely, the water supply tank 17 is guided in the predetermined position of the tank case door member 31 with the inserting operation. Further, when the water supply tank 17 is pushed toward the water inlet 59, as shown in FIG. 10B, the outer side surfaces of the straight wall parts 61a and 61b of the stanch rib 61 standing at the bottom surface 67 of the tank case door member 31 come into contact with the inner wall surfaces of the bottom ribs 52a and 52b of the water supply tank 17, and the water tank 17 slides while its position is being regulated.

Thereafter, as shown in FIG. 10C, insertion resistance increases in a position where the projection 54a provided for the raised bottom part 54 of the tank body 51 comes into contact with the projection 69 provided for the bottom surface 67 of the tank case door member 31, and the inserting operation is stopped once. When the water supply tank 17 is further pushed toward the water inlet 59 from this state, as shown in FIG. 10D, the projections 69 and 54a get over each other by elastic deformation of the elastic fitting piece 63, and flat rear end surfaces of the projections 69 and 54a fit to each other so that the water supply tank can not go back. When these projections get over each other, namely, when the state shown in FIG. 10C becomes the state shown in FIG. 10D, click feeling is produced, and the water supply port 55 and the water inlet 59 engage with each other, whereby the water supply tank 17 is surely attached in the predetermined holding position. Further, by attaching the water supply tank 17 to the tank case door member 31, the water supply tank 17 becomes a reinforcing member for the tank case door member 31, so that a part of the door (particularly end part 66 (refer to FIG. 6)) which is low in rigidity in a state of only the tank case door member 31 and difficult to close in pushing the door becomes easy to close.

In the high-frequency heating apparatus with a steam generating function 100, since the flow of the water that has leaked from the water supply port 55 or the water inlet 59 is stanched by the stanch rib 61, without spreading over other regions of the bottom surface part 67 than the region partitioned by the stanch rib 61, the water drops from the scupper 60 and is absorbed in the sponge 1 bonded to the tank case body 27. Therefore, the water that has leaked can be treated so as not to remain into the tank case door member 31. In result, it is not misunderstood that the water is leaking from the water supply tank 17.

Further, the high-frequency heating apparatus with steam generating function 100 in the embodiment has the raised bottom part 54 at the bottom of the water supply tank 17. In the state where the water supply tank 17 is attached to the tank case door member 31, the spaced height between the top part of the stanch rib 61 of the tank case door member 31 and the bottom in the raised bottom part 54 is set to the height by which the contact of the bottom part of the tank body with the water is prevented even in case that the water adheres to the top of the stanch rib 61. Consequently, even if the water that has flown out of the water support port 55 or the water inlet 59 adheres to the stanch rib 61 or the bottom surface part 67 surrounded by the stanch rib 61, this water never adheres to the bottom part of the tank body 51. Therefore, it is possible to prevent the water from leaking out to the outside of the stanch rib 61 through the tank bottom.

Further, the bottom ribs 52a and 52b of the water supply tank 17 come into slide-contact with the straight wall parts 61a and 61b of the tank case door member 31, the side surface part 68, and the guide wall 67a, and the water supply tank 17 is inserted into the tank case door member 31. Further, since the projection 69 of the tank case door member 31 and the projection 54a of the water supply tank 17 fit to each other, the water supply tank 17 is surely attached in the exact holding position.

Further, since the water that has leaked into the tank case door member 31 comes out from the scupper 60 forming the elastic fitting piece 63, labor and cost for newly forming the scupper can be omitted.

As described above, according to the water supply tank unit of the invention, the water that has leaked when the water supply tank is detached can be treated so as not to remain.

What is claimed is:

1. A water supply tank unit attached to a heating apparatus having a steam generating function and holds a water supply tank detachably, said tank unit comprising:
a tank support member for supporting the water supply tank inserted to the water supply tank unit, said tank support member including: a water pour connection port connected to a water supply connection port with an inserting operation of the water supply tank; and a scupper provided at the bottom near the water pour connection port; and a water absorption means provided below the scupper of said tank support member.

2. The water supply tank unit according to claim 1, wherein, at the bottom of said tank support member, a water storing wall which surrounds said scupper and stands from said bottom is provided.

3. The water supply tank unit according to claim 2, wherein said water storing wall has at its part a straight wall part parallel to the inserting direction of said water supply tank, and wherein said water supply tank has at the tank bottom a guide which comes into slide-contact with said straight wall part in insertion into said tank support member.

4. The water supply tank unit according to claim 3, further comprising:

a raised bottom part of said water supply tank is formed at a part of the bottom of said water supply tank, wherein, when the water supply tank is held by said tank support member, said raised bottom part defines space for bringing the water storing wall of said tank support member and the bottom of said tank support member inside the water storing wall into no-contact with the tank bottom of said water supply tank, when the water supply tank is held by said tank support member.

5. The water supply tank unit according to claim 2, further comprising:

a raised bottom part of said water supply tank is formed at a part of the bottom of said water supply tank, wherein, when the water supply tank is held by said tank support member, said raised bottom part defines space for bringing the water storing wall of said tank support member and the bottom of said tank support member inside the water storing wall into no-contact with the tank bottom of said water supply tank, when the water supply tank is held by said tank support member.

6. The water supply tank unit according to any one of claims 2 to 4, further comprising:

an elastic fitting piece provided at a bottom of said tank support member, said elastic fitting piece is provided with a projection part which fits to the water supply tank inserted to the tank support member and locks the water supply tank, wherein said elastic fitting piece is formed by providing a cavity around the elastic fitting piece except a base part at the bottom of said tank support member, and wherein said cavity is used as said scupper.

7. A heating apparatus comprising: a body case;

a steam generating part in a heating room, including an evaporation tray; and a water supply tank unit attached to the body case, for holding a water supply tank detachably, wherein said water supply tank unit includes:

a tank support member for supporting the water supply tank inserted into the water supply tank unit, said tank support member having: a water pour connection port connected to a water supply connection port with an inserting operation of the water supply tank; and a scupper provided at the bottom near the water pour connection port; and a water absorption means provided below the scupper of said tank support member.

8. A water supply tank unit attached to a heating apparatus having a steam generating function and holds a water supply tank detachably, said tank unit comprising:

a tank support member for supporting the water supply tank inserted to the water supply tank unit, said tank support member including: a water pour connection port connected to a water supply connection port with an inserting operation of the water supply tank; and a scupper provided at the bottom near the water pour connection port;

a water absorption means provided below the scupper of said tank support member;

an elastic fitting piece provided at a bottom of said tank support member, said elastic fitting piece is provided with a projection part which fits to the water supply tank inserted to the tank support member and locks the water supply tank, wherein said elastic fitting piece is formed by providing a cavity around the elastic fitting piece except a base part at the bottom of said tank support member, and wherein said cavity is used as said scupper.

* * * * *